United States Patent Office 3,672,745
Patented June 27, 1972

3,672,745
BEVELLED EDGE MICROSCOPE SLIDE

Irving A. Speelman, Roslyn Heights, N.Y., assignor to Propper Manufacturing Co., Inc., Long Island City, N.Y.
Continuation of application Ser. No. 746,060, July 19, 1968, which is a continuation-in-part of application Ser. No. 477,801, Aug. 6, 1965. This application June 29, 1970, Ser. No. 50,975
Int. Cl. G02b 21/34
U.S. Cl. 350—92
2 Claims

ABSTRACT OF THE DISCLOSURE

A microscope slide having peripheral side and end edges or peripheral end edges which are bevelled with a bevelled end edge of the slide operative for smearing of a specimen on the face of another companion slide. The bevelled side edges are structured to provide a wavy configuration to facilitate grasping of the slide for the smearing operation.

---

This application is a continuation of my application Ser. No. 746,060, filed on July 19, 1968, now abandoned, said application having been a continuation-in-part of my application Ser. No. 477,801, filed Aug. 6, 1965, also now abandoned.

DETAILS OF THE INVENTION

The present invention relates to microscope slides.

At the present time, microscope slides are made of glass which is clear and almost fully transparent and these glass slides also are generally of a rectangular configuration.

These slides are used for all purposes in microscopy, and one of the important uses for such slides is for the mounting of specimens such as specimens of blood.

The common accepted practice in preparing specimens is to smear the specimen on a slide by pushing a drop of the liquid specimen over the surface of one slide with an edge of another slide. This necessity of smearing the specimen requires the operator to grasp a slide which is used as a smearing tool, and the result is that the operator must press against relatively sharp glass edges and also must use such a sharp glass edge for the purpose of smearing the specimen. This requirement represents a serious drawback because it frequently results in cuts to the fingers of the operator, makes a secure grasping of the smearing slide difficult and more importantly, fails to provide an efficient smearing tool.

It is accordingly a primary object of the present invention to provide a microscope slide which will avoid the above drawbacks.

In particular, it is an object of the present invention to provide a microscope slide which will smear a specimen far more efficiently than is possible with a conventional slide.

Another object of the present invention is to provide a microscope slide which can be comfortably and securely grasped without any danger of cutting the fingers of the operator.

In addition, it is an object of the present invention to provide a microscope slide which when used to smear a specimen will greatly reduce the possibility of spilling of the specimen over the edge of the slide on which it is smeared.

In addition, it is an object of the present invention to provide a slide which can be easily introduced into a mailer, for example.

Primarily the slide of the invention is also of a generally rectangular configuration and made of a clear, transparent glass of very high quality. However, the opposed faces of the slide of the invention terminates in peripheral edges which are bevelled, and it has been found that the bevelled edge very greatly facilitates the smearing of a specimen, as compared with smearing attempted by a sharp edge. Furthermore, the corners of the slide of the invention are rounded so that in this way the smearing edge is of a shorter length than the width of the slide along which the smearing edge is drawn, so as to avoid spilling of the specimen over the edges of the slide on which it is smeared. Furthermore, rounded corners facilitate the introduction of the slide into a mailer or the like. Finally, not only do the bevelled edges themselves contribute to a more comfortable and secure grasping of the slide by the operator, but in addition these bevelled edges are spaced from each other to provide between themselves plateaus which are of a wavy configuration along at least the opposed side edges of the slide which are grasped by the fingers of the operator, and this wavy or serrated configuration of the plateaus between the bevels also contributes to the security and comfort of the gripping of the slide by the operator.

Alternatively, the bevelled peripheral edges may be at the end edges only, leaving the side edges of conventional construction and configuration, this arrangement providing for smearing a specimen in an improved manner as aforedescribed.

The invention is illustrated by way of example in the accompanying drawing in which.

Figure 1:
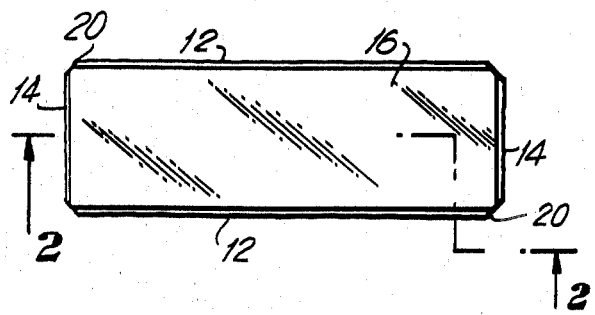
FIG. 1 is a top plan view of a slide according to the present invention.

Referring to FIG. 1, the slide 10 illustrated therein is conventionally made of a transparent clear glass and is of a generally rectangular configuration as shown in FIG. 1, so that the slide has a pair of opposed side edges 12 and a pair of opposed end edges 14 which are of course shorter than the side edges 12.

Figure 2:
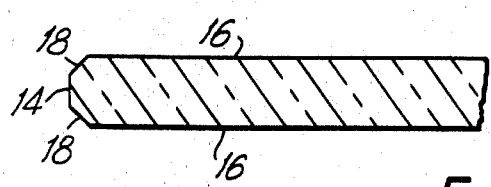
FIG. 2 is a fragmentary partly sectional view of the slide of FIG. 1, taken along line 2—2 of FIG. 1 in the direction of the arrows, and showing the slide on a scale larger than FIG. 1.
Figure 2:
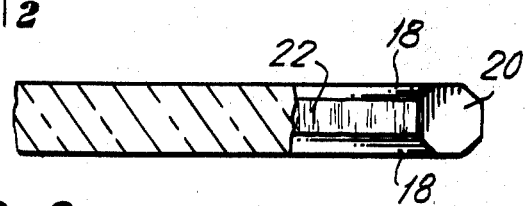

As made be seen from FIG. 2, as well as FIG. 1, the slide has a pair of opposed faces 16, and these faces terminate in free peripheral edges which are bevelled in the manner shown most clearly at the right of FIG. 2. The bevelled edges 18 which extend along the peripheries of the faces 16 that may have any convenient angle such as an angle of 45° with respect to the flat faces 16, and as is shown in FIG. 1 these bevelled edges 18 extend along the entire peripheries of both faces of the slide.

In addition, the slide 10 of the invention has rounded corners 20, and as shown most clearly in FIG. 2 each "rounded" corner 20 is flat and of a substantially octagonal configuration.

Furthermore, it will be noted that the bevelled edges 18 are spaced from each other so as to define between themselves a plateau 22 extending along the periphery of the slide, and at least along the opposed edges 12, which are the longer side edges grasped by the operator, these plateaus 22 are of a wavy, serrated configuration contributing to the security and comfort of the grasp of the slide by the operator.

Figure 3:
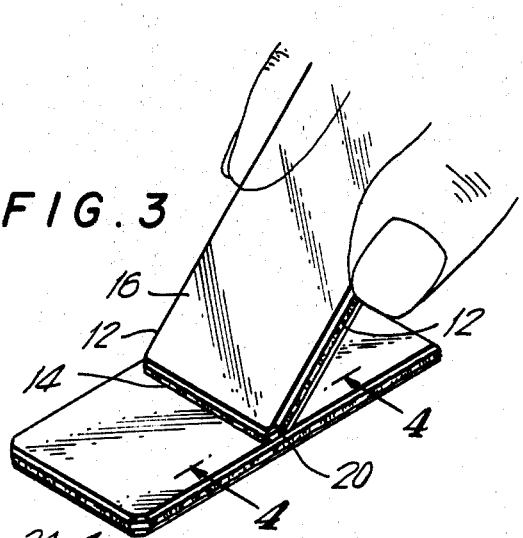
FIG. 3 illustrates the manner in which the slide of the invention is manipulated.

Referring to FIG. 3, there is shown therein a slide 24 on which a specimen is to be smeared by the slide 10 of the invention. Of course, it is to be understood that slide 24 may be identical with slide 10. As may be seen from FIG. 3, the fingers of the operator very comfortably grasp the opposed elongated bevelled side edges 12 with their wavy plateaus 22.

Figure 4:
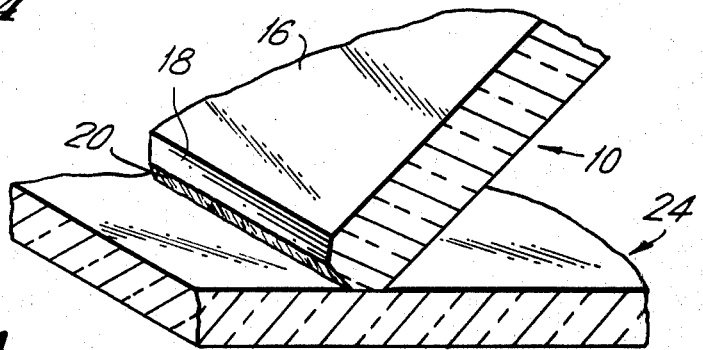
FIG. 4 shows the cooperation of a pair of slides in an enlarged sectional perspective view.

In addition, it may be seen from FIG. 4, the smearing slide 10 engages the upper surface of the slide 24 on which the specimen is located with one of the bevelled edges which provides a flat smearing surface rather than a sharp edge, and such a flat smearing surface will provide a far more efficient smear than a sharp edge.

Moreover, as is apparent from FIG. 3, the rounded corners 20 at the ends of the smearing edge of the slide 10 render the length of this smearing edge shorter than the width of the slide 24 along which the smearing slide 10 is pushed, so that if any of the specimen should approach the opposed side edges of the face of the slide 24 on which the specimen is situated, this part of the specimen 10 flows past the rounded corners 20 without spilling over the side edges of the slide 24, and in this way a far more efficient spreading of the specimen without a substantial risk of spilling of the specimen over the edges of the slide is provided.

Furthermore, the rounded corners 20 facilitate insertion of the slide into a mailer, for example.

It has been found that with the above features of the present invention, the slide is far more comfortable to operate and results in far better smears which can be produced quickly and easily. In addition, the slide of the invention is so inexpensive that while it may be used over and over, nevertheless it is still economical to use the slide once and discard it.

Figure 5:
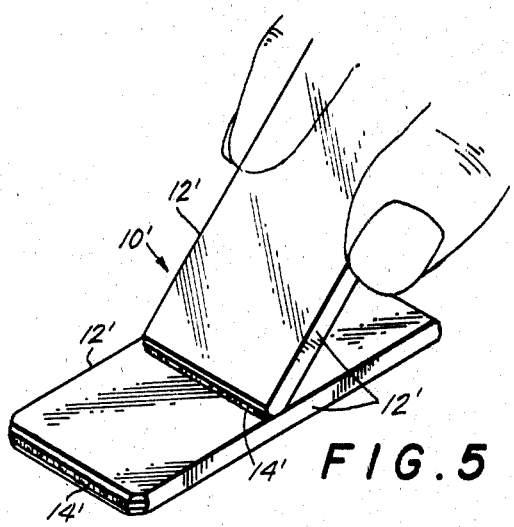
FIG. 5 is a view similar to FIG. 3 showing another embodiment of a slide.

With refernce to FIG. 5, there is shown another embodiment of the present invention in which the slide 10' corresponds to the slide 10 except that the side edges 12' are planar and correspondingly conventionally constructed and configured. The end edges 14' are bevelled and correspond to the end edges 14 of slide 10 and thus have the enhanced smearing characteristics previously described by the provision of a flat smearing surface. Thus, if desired, the slide of the present invention may be provided with bevelled peripheral edges at both the side and end edges or may be provided with bevelled edges at the end edges only as in the case of slide 10', the latter having all the advantages with respect to improved smearing while retaining a conventional construction and appearance at the side edges.

What I claim is:

1. A general purpose microscope slide comprising a glass plate of substantially rectangular configuration having a pair of opposed sides said sides having a wavy configuration, a pair of opposed ends which are shorter than said sides, and a pair of opposed faces, said faces defining substantially smooth planar surfaces free of interruption terminating in peripheral edges which extend along said sides and ends of said slide, said peripheral edges at said ends being substantially uniformly bevelled with the bevelled edges at each end being spaced from each other to define an intermediate plateau therebetween which extends along the periphery of said slide at said end, said bevelled end edges defining corresponding flat smearing surfaces each extending at an angle to said intermediate plateau to facilitate the smearing of a specimen on the planar surface of a companion one of said slides, the combined surface area of said angularly extending flat smearing surfaces at each end being greater than the surface area of said intermediate plateau at said end, the corners of said slide being flattened to prevent the spreading of a specimen over the side edges of said companion slide during the aforesaid smearing.

2. A slide as recited in claim 1 wherein said peripheral edges along said sides are also bevelled along the edges of said planar surfaces, said side bevelled edges being spaced from each other and defining therebetween a plateau.

References Cited
UNITED STATES PATENTS

| | | | |
|---|---|---|---|
| 336,257 | 2/1886 | Palmer | 350—92 |
| 1,824,097 | 9/1931 | Ott | 350—95 X |
| 1,858,308 | 5/1932 | Schiller | 350—92 UX |
| 1,940,373 | 12/1933 | Schoenberg | 356—70 |
| 2,039,219 | 4/1936 | Hausser et al. | 350—92 UX |
| 2,893,040 | 7/1959 | Beens | 15—236 |

JOHN K. CORBIN, Primary Examiner

T. K. KUSMER, Assistant Examiner